(12) United States Patent
Dupin De La Gueriviere

(10) Patent No.: US 9,670,908 B2
(45) Date of Patent: Jun. 6, 2017

(54) INSTALLATION AND METHOD FOR EXPLOITING WIND ENERGY

(75) Inventor: Paul Dupin De La Gueriviere, Rousset (FR)

(73) Assignee: IDEOL, La Ciotat (FR)

( * ) Notice: Subject to any disclaimer, the term of this patent is extended or adjusted under 35 U.S.C. 154(b) by 984 days.

(21) Appl. No.: 13/885,696

(22) PCT Filed: Nov. 14, 2011

(86) PCT No.: PCT/FR2011/052633
§ 371 (c)(1),
(2), (4) Date: Oct. 28, 2013

(87) PCT Pub. No.: WO2012/066223
PCT Pub. Date: May 24, 2012

(65) Prior Publication Data
US 2014/0044541 A1    Feb. 13, 2014

(30) Foreign Application Priority Data
Nov. 17, 2010 (FR) ..................... 10 59434

(51) Int. Cl.
*F03B 15/06* (2006.01)
*F03D 11/04* (2006.01)
(Continued)

(52) U.S. Cl.
CPC ............ *F03D 11/045* (2013.01); *B63B 21/50* (2013.01); *B63B 22/02* (2013.01); *B63B 35/44* (2013.01);
(Continued)

(58) Field of Classification Search
CPC ...... F03D 7/0204; F03D 7/0296; F03D 7/048; F03D 11/045; F05B 2240/93;
(Continued)

(56) References Cited

U.S. PATENT DOCUMENTS 7,985,108 B1 * 7/2011 Bekker ................. B63B 1/107
114/144 B
8,022,566 B2 * 9/2011 Loh ....................... F03D 7/0224
290/44

(Continued)

FOREIGN PATENT DOCUMENTS

DE 102007022705 11/2008
EP 2 267 297 A2 12/2010
(Continued)

OTHER PUBLICATIONS

International Search Report of PCT/FR2011/052633 dated Mar. 14, 2012 (Form PCT/ISA/210), French version and English translation (4 pages).

(Continued)

*Primary Examiner* — Ninh H Nguyen
(74) *Attorney, Agent, or Firm* — Bookoff McAndrews, PLLC

(57) ABSTRACT

The invention relates to the field of methods and floating platforms for exploiting wind energy offshore. In particular, the invention provides a floating platform (1) anchored to at least one anchor point (7, 7'), including a wind turbine (2), and a shift device for shifting the wind turbine (2), which device is configured to shift the wind turbine (2) as a function of a set of parameters, including wind direction (V), in order to minimize the aerodynamic wake effects, and the invention also provides a method of exploiting wind energy by means of a set of floating platforms (1), each of which includes at least one wind turbine (2) and is anchored to at least one anchor point (7,7'). In this method, at least one wind turbine (2) of said set of floating platforms is shifted as a function of a set of parameters, including wind direction (V) in order to minimize the aerodynamic wake effects and (Continued)

in order to maximize the power generation of the set of wind turbines.

16 Claims, 9 Drawing Sheets

(51) Int. Cl.
    *F03D 7/04*         (2006.01)
    *B63B 21/50*       (2006.01)
    *B63B 22/02*       (2006.01)
    *B63B 35/44*       (2006.01)
    *B63H 25/00*       (2006.01)
    *B63H 25/42*       (2006.01)
    *F03D 9/00*         (2016.01)
    *F03D 13/20*       (2016.01)
    *F03D 13/25*       (2016.01)
    *B63H 15/00*       (2006.01)

(52) U.S. Cl.
    CPC .............. *B63H 25/00* (2013.01); *B63H 25/42* (2013.01); *F03D 7/048* (2013.01); *F03D 9/005* (2013.01); *F03D 13/22* (2016.05); *F03D 13/25* (2016.05); *B63B 2035/446* (2013.01); *B63H 15/00* (2013.01); *F05B 2240/93* (2013.01); *F05B 2240/95* (2013.01); *F05B 2240/96* (2013.01); *Y02E 10/727* (2013.01)

(58) Field of Classification Search
    CPC .............. F05B 2240/95; F05B 2240/96; F05B 2240/98; B63B 21/50; B63B 21/505; B63B 35/44; B63H 25/42
    See application file for complete search history.

(56) References Cited

U.S. PATENT DOCUMENTS

| 2003/0168864 | A1 | 9/2003 | Heronemus et al. | |
| 2011/0148115 | A1* | 6/2011 | Roznitsky | F03D 1/001 |
| | | | | 290/44 |
| 2011/0215650 | A1* | 9/2011 | Slocum | F03B 13/06 |
| | | | | 307/72 |
| 2011/0241347 | A1* | 10/2011 | Boureau | F03D 1/001 |
| | | | | 290/53 |
| 2012/0000071 | A1* | 1/2012 | Harris | F03D 1/001 |
| | | | | 29/889 |
| 2012/0121340 | A1* | 5/2012 | Pao | B63B 21/50 |
| | | | | 405/203 |

FOREIGN PATENT DOCUMENTS

| JP | 2001-509565 A | 7/2001 | |
| JP | 2005-520088 A | 7/2005 | |
| JP | 2006-160025 A | 6/2006 | |
| JP | 2007-285214 A | 11/2007 | |
| JP | 2007-331414 A | 12/2007 | |
| JP | 2010-526963 A | 8/2010 | |
| JP | EP 2267297 A2 * | 12/2010 | ............ F03D 11/04 |
| JP | 2011-007085 A | 1/2011 | |
| WO | WO 9902856 A1 | 1/1999 | |
| WO | WO 2007/009464 A1 | 1/2007 | |

OTHER PUBLICATIONS

Written Opinion of PCT/FR2011/052633 dated Mar. 14, 2012 (Form PCT/ISA/237) (6 pages).
Notification of Reasons for Refusal dated May 31, 2016, issued from corresponding JP Patent Application No. 2013-539310, 4 pages.

* cited by examiner

INSTALLATION AND METHOD FOR EXPLOITING WIND ENERGY

CROSS-REFERENCE TO RELATED APPLICATIONS

This application is a National Stage filing under 35 U.S,C. §371 of International Application No. PCT/FR2011/052633, filed Nov. 14, 2011, which claims priority to French Patent Application No. 1059434, filed Nov. 17. 2010, both of which are incorporated by reference herein in their entireties.

BACKGROUND

The present invention relates to a method and to a floating platform for exploiting wind energy, in particular offshore at sea.

SUMMARY

In recent years, exploitation of wind energy has enjoyed increasing interest, both for reducing dependency on fossil energy sources, and also for avoiding greenhouse gas emissions. In particular, installing wind turbines offshore makes it possible to build and operate large-scale wind farms in zones having high average wind speeds, while also limiting the sight and sound impact that often prevent wind turbines from being erected on dry land. Although wind turbines have been erected offshore directly on foundations laid on the sea floor, such a method is normally limited to relatively shallow depths, which therefore limits the number of potential sites on which it can be used. Floating installations for exploiting wind energy have thus been proposed. Such installations are held in position relative to the sea floor by means of anchor lines, including, for example, cables, chains, ropes, etc., rather than by rigid structures.

For example, in International Patent Application WO 2009/048830, a floating platform anchored to at least one anchor point has been proposed with a wind turbine and an anchor line. In International Patent Application WO 03/004869, a floating platform anchored to at least one anchor point has been proposed with at least one wind turbine, and a device for shifting the wind turbine. The term "shift" is used to mean a change of position of the wind turbine that is different from a mere change of direction such as pivoting it about its vertical axis in order to point it relative to the wind, as has been known for a long time. With such floating platforms, it thus becomes possible to install wind turbines even offshore in deep water, and to hold them in position.

A drawback with wind turbines both on land and offshore, in particular when, rather than being installed on their own, they are installed in wind farms, i.e. in sets of a plurality of turbines, is that the aerodynamic wake of each turbine can adversely affect the power generation of the adjacent turbines. In order to remedy that drawback at least partially, the wind turbines in a wind farm are normally positioned, in such a manner as to minimize the wake effects between turbines. However, especially on sites on which the wind directions are dispersed, such positioning does not normally enable full optimization to be achieved, unless the spacing between the turbines is increased, considerably, and power generation losses due to the wake effects remain.

An object of the invention is to propose a floating installation for exploiting wind energy that makes it possible to maximize power generation.

This object is achieved by the fact that the shift device for shifting the wind turbine of at least a first embodiment of a floating platform of the invention is configured to shift the wind turbine as a function of a set of parameters, including wind direction, in order to minimize the aerodynamic wake effects. In the present context, the term "set of parameters" should not be understood as necessarily including a plurality of parameters. Wind direction may optionally be the sole parameter as a function of which the shift device is configured to shift the turbine.

By means of such a configuration of the device for shifting the wind turbine, it is possible to reposition the turbines of a wind farm in such a manner as to minimize the wake effects for each of the wind directions, and thus to maximize the power generation of the farm.

Advantageously, said shift device is an active shift device, i.e. a shift device including a set of actuators and/or thrusters that can re-position the wind turbine actively. In particular, it may include at least one actuator suitable for pulling on at least one anchor line in order to shift the wind turbine. The wind turbine can thus be shifted easily and accurately as a function of a set of parameters, including wind direction. In order to facilitate access to and maintenance of the wind turbine, the anchor line coupled to the actuator may have two ends, each of which is connected to a different anchor point. Thus, the traction exerted by the actuator makes it possible to shift the wind turbine over a path between the two anchor points while also significantly reducing the efforts exerted by the anchor lines on said device. The actuator does not necessarily have to be on board the floating platform. It may instead be on board a maintenance ship that docks with the floating platform for seasonal shifts, in particular when the floating platform is situated in a zone in which the seasonal wind variations are very marked, such as, for example, monsoon zones or trade-wind zones. An active shift device may also include at least one hydrodynamic thruster suitable for exerting thrust to shift the wind turbine, in such a manner that the shift is performed by thrust from said hydrodynamic thruster on at least a portion of the floating platform.

Advantageously, such an active shift device may be connected to a control unit, suitable for being connected to a set of sensors for sensing various different parameters, in particular wind direction and/or wind speed, water current direction and/or water current speed, swell, and/or the positions of adjacent, platforms, so as to cause the wind turbine to shift as a function of signals transmitted by said set of sensors. Repositioning the wind turbine can thus be automated.

The floating platform may, for example, include a mooring buoy, in particular a mooring buoy anchored to a plurality of anchor points, and a floating arm that supports said wind turbine and that is connected to said buoy via a hinge having at least a vertical axis of rotation. This configuration can enable the wind, turbine to be shifted passively by a wind-vane effect, the aerodynamic and hydrodynamic forces exerted by the wind and by the water currents on the wind turbine and on the floating arm causing the floating arm to turn with the wind turbine, about said vertical axis. However, in order for the shifting of the wind turbine to be controlled actively, said shift device may also be an active shift device including, in particular, a thruster coupled to said floating arm and/or at least one actuator suitable for pulling on an anchor line of the floating arm so as to shift the floating arm about the vertical axis of rotation.

Advantageously, said shift device is suitable for shifting the wind turbine in a horizontal plane as a function of a set of parameters including wind direction. However, alternatively or in addition to such horizontal shifting, said shift device may also be suitable for shifting the wind turbine vertically as a function of a set of parameters including wind direction. For this purpose, the shift device may, for example, include a device for varying the ballasting of the floating platform or a moving tower of the wind turbine.

The invention also provides a wind farm including a. plurality of such floating platforms. It thus also provides a method of exploiting wind energy by means of a set of floating platforms, each of which is anchored to at least one anchor point and each of which includes at least one wind turbine, wherein at least one wind turbine of said set of floating platforms is shifted as a function of a set of parameters, including wind direction in order to minimize the aerodynamic wake effects and in order to maximize the power generation of the wind farm. This shift may be controlled as a function of the instantaneous wind direction or of the short-term forecast wind direction, or indeed of the prevailing wind direction over long periods. For example, the wind turbines may be shifted as a function of season on sites in which winds are seasonal.

In the present context, the term "set of floating platforms" should not be understood, as necessarily including a plurality of floating platforms. Indeed, this method is also applicable to isolated platforms. However, the main advantage of the method is that it makes it possible to minimize the wake effects in wind farms including a plurality of platforms.

Advantageously, the wind turbine is shifted, as a function of a set of parameters including wind direction, into a predefined position for maximizing the power generation of the wind farm using a model for simulating the aerodynamic wakes of the set of floating platforms for said set of parameters. Said aerodynamic models may also be optimized and readjusted empirically during operation of the wind turbine by means of collected measurements and data.

BRIEF DESCRIPTION OF THE DRAWINGS

The invention can be well understood and its advantages appear more clearly on reading the following detailed, description of an embodiment shown by way of non-limiting example. The description refers to the accompanying drawings, in which.

DETAILED DESCRIPTION

Figure 1A:
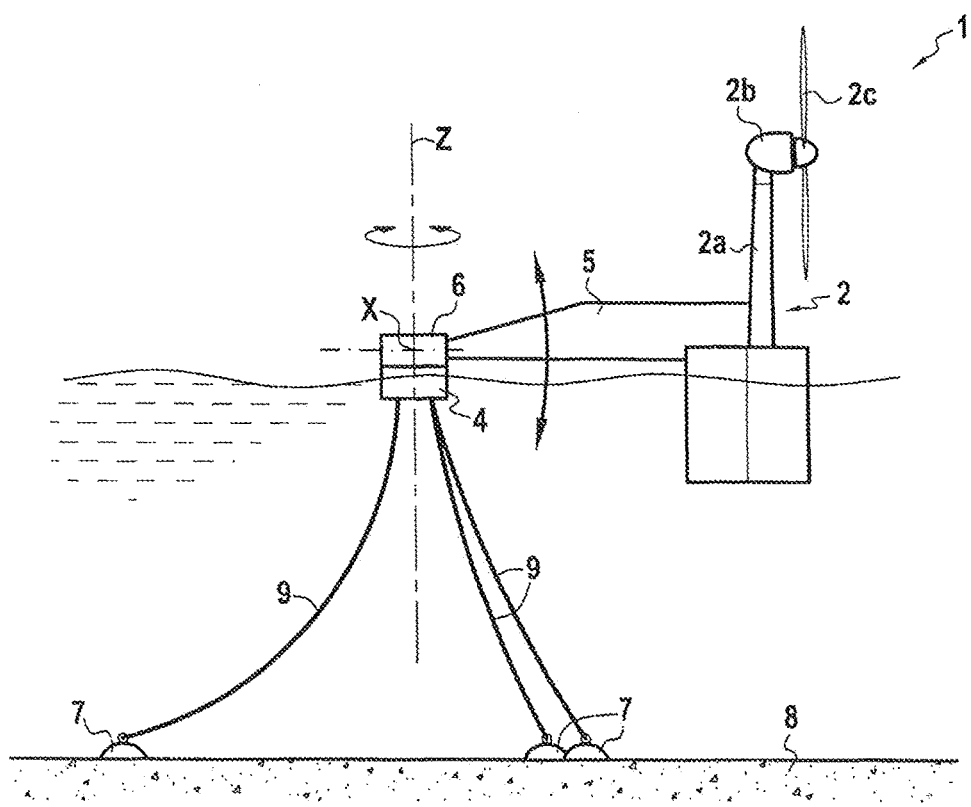
FIG. 1A is a side view of a first embodiment of a floating platform of the present invention.
Figure 1B:
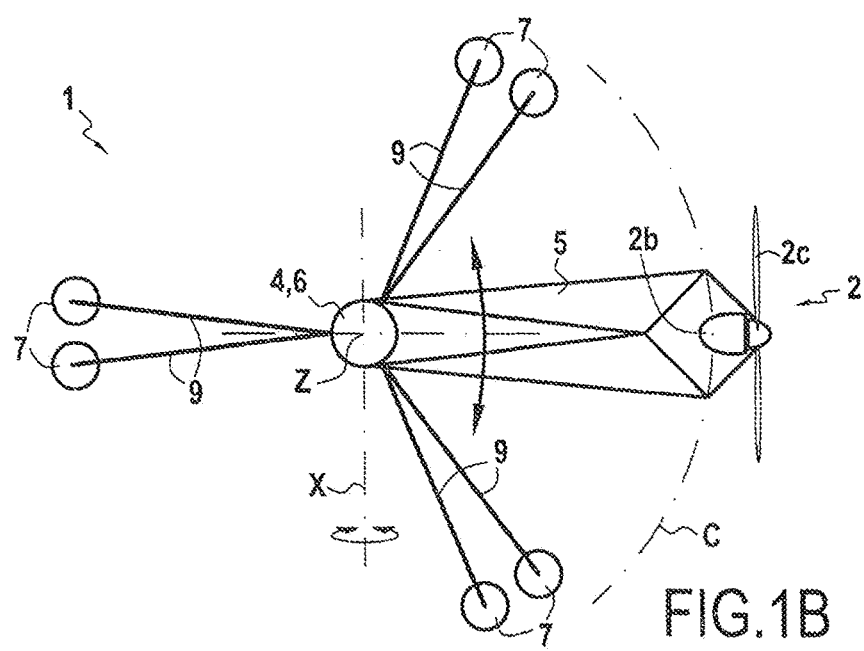
FIG. 1B is a view from above of the installation of FIG. 1A.

A first embodiment of a floating platform 1 for exploiting wind energy including a wind turbine 2 that can be shifted in a horizontal plane as a function of a set of parameters, including wind direction, is shown in FIGS. 1A and 1B. This wind turbine 2 includes a tower 2a, a nacelle 2b that contains an electricity generator and that is steerable about a vertical axis relative to the mast 2a, and a multi-blade rotor 2c having a substantially horizontal axis of rotation. The floating platform 1 also includes a mooring buoy 4, and a floating arm 5 connected to said mooring buoy 4 via a hinge 6. Said buoy 4 is anchored to a plurality of anchor points 7 on the sea floor 8 via anchor lines 9. Although in the embodiment shown, the anchor points 7 are shown as suction anchors in section, other alternative forms may be considered, such as, in particular, conventional anchors, gravity anchors, driven piles, screw anchors, or other types of anchor. Alternatively or in addition, the anchor lines 9 may also be fastened to pre-existing fixed structures such as other platforms, quays, rocks, piles, etc. In addition, even though, in each of the embodiments shown, the platform 1 has a plurality of anchor lines 9 connected to a plurality of anchor points 7, so as to ensure that the platform 1 is held in position more securely, the present invention is also applicable to a floating platform with a single anchor line connected to a single anchor point.

In this first embodiment, the wind turbine 2 is supported by the floating arm 5 that, together with the hinge 6, forms a shift device for shifting the wind turbine 2. Since the hinge 6 has a vertical axis of rotation Z, the floating arm 5 can turn about the buoy 4, actuated by the force of the wind in the manner of a wind vane, shifting the wind turbine 2 over a circular path C about the buoy as a function of a set of parameters including wind direction. By means of this shifting of the wind turbine 2, it is possible to position it to minimize the wake effects of said wind turbine 2 on adjacent installations, and/or the wake effects of the adjacent installations on said wind turbine 2. The hinge 6 may also have a horizontal axis of rotation X, enabling the floating arm 5 to move angularly to a small in extent in a vertical plane to compensate for the effect of the swell.

Figure 2A:
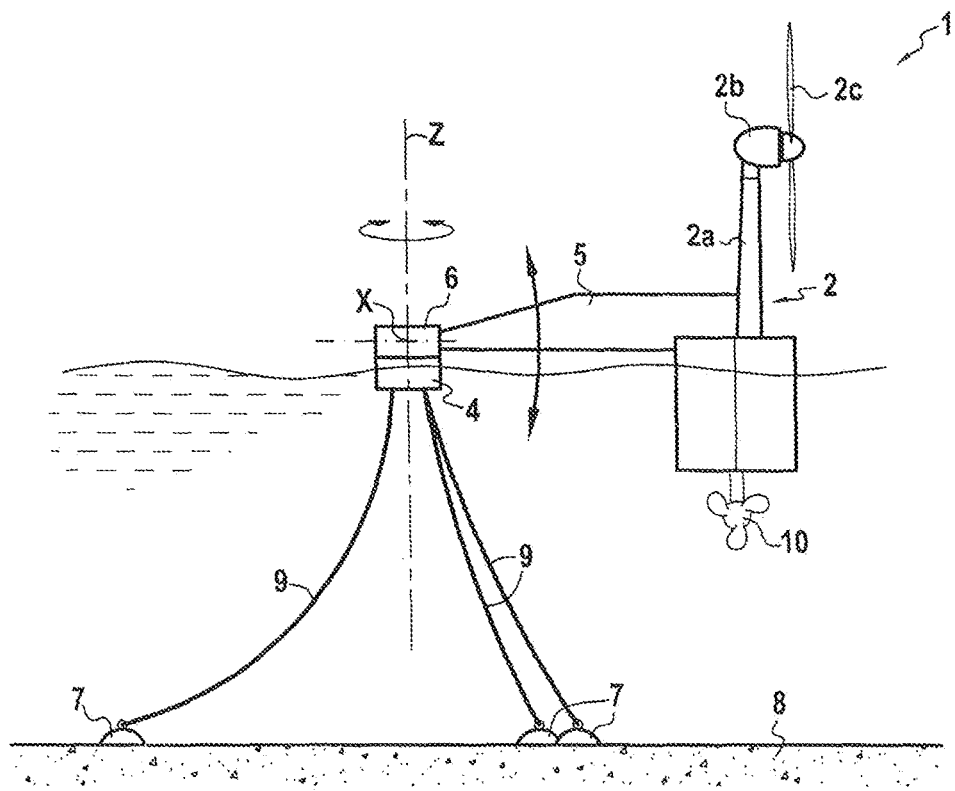
FIG. 2A is a side view of a second embodiment of a floating platform of the present invention.
Figure 2B:
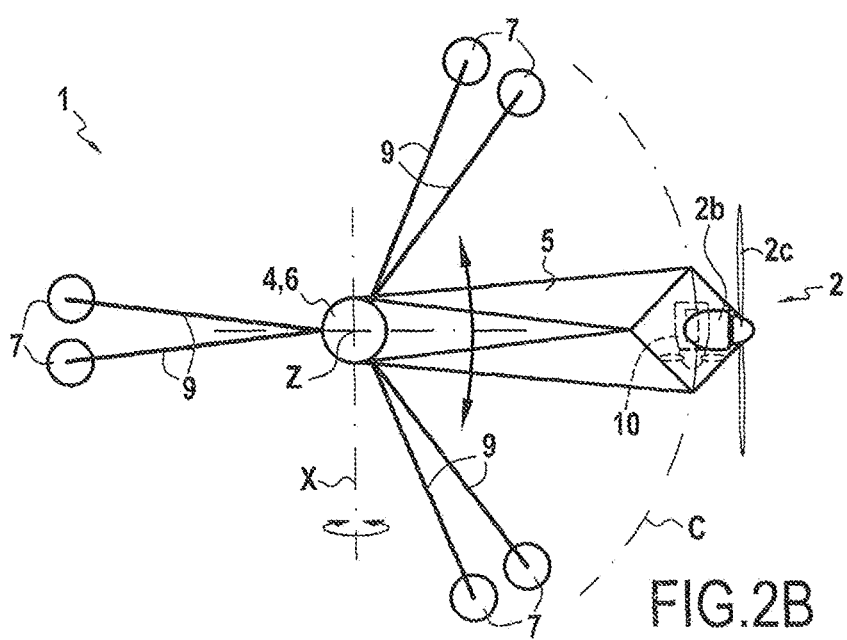
FIG. 2B is a view from above of the floating platform of FIG. 2A.

Although the first embodiment of the installation already offers a passive shift device, actuated by the same force of the wind, it is normally preferable to have means enabling the shifts of the wind turbine to be controlled actively. In a second embodiment shown in FIGS. 2A and 2B, the floating platform 1 also includes a mooring buoy 4, and a floating arm 5 connected to said mooring buoy 4 via a hinge 6 and supporting the wind turbine 2. As in the first embodiment, the buoy 4 is anchored to a plurality of anchor points 7 on the sea floor 8 via anchor lines 9. However, in this second embodiment, the floating arm 5 does not turn about the axis Z driven only by the force of the wind, but rather it also has a hydrodynamic thruster 10 pointing perpendicularly relative to the arm and connected to a control device. In this manner, the direction in which the arm 5 points and thus also the position of the turbine 2 in the circle C, can be controlled as a function of a set of parameters, including wind direction.

Figure 3A:
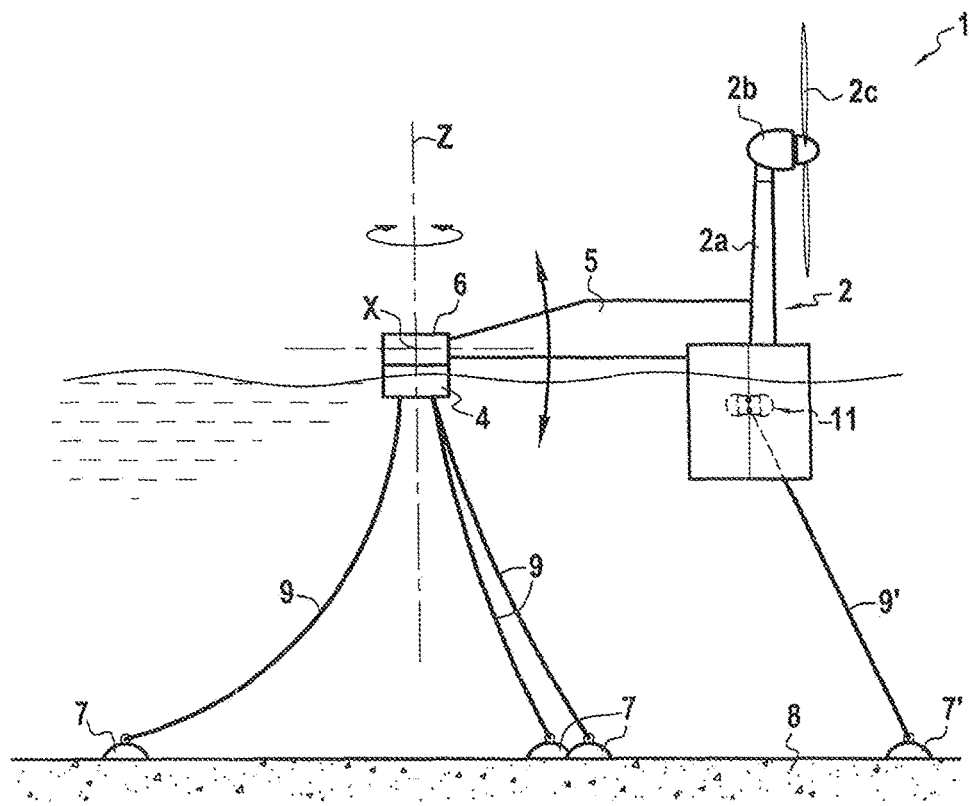
FIG. 3A is a side view of a third embodiment of a floating platform of the present invention.
Figure 3B:
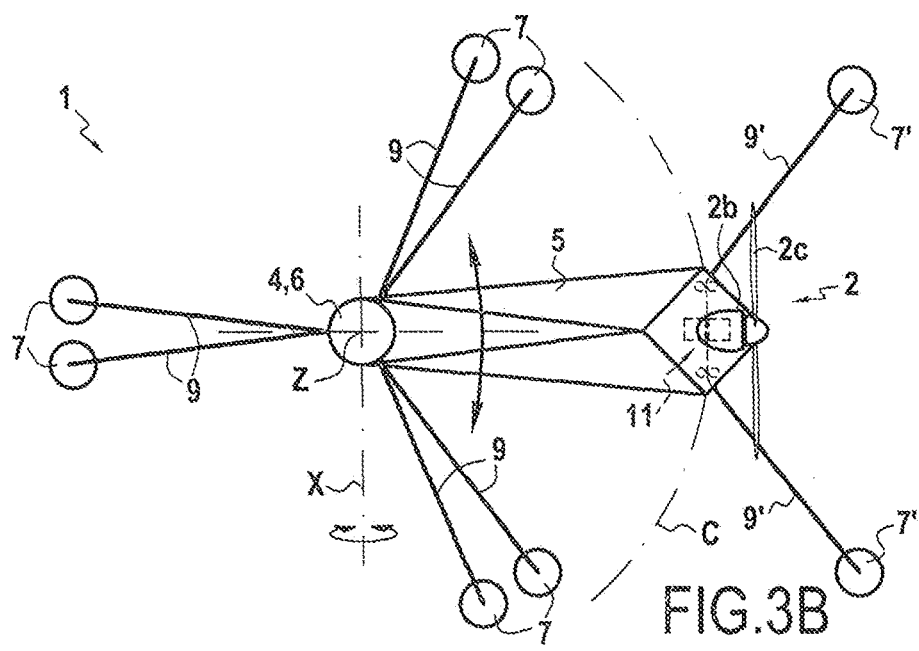
FIG. 3B is a view from above of the installation of FIG. 3A.

In a third embodiment shown in FIGS. 3A and 3B, the floating platform 1 also includes a mooring buoy 4, and a floating arm 5 connected to said mooring buoy 4 via a hinge 6 and supporting the wind turbine 2. As in the first and second embodiments, the buoy 4 is anchored to a plurality of anchor points 7 on the sea floor 8 via anchor lines 9. However, in this third embodiment, the floating arm 5 is also anchored to anchor points 7' on the sea floor via an anchor line 9'. On the floating platform 3, an actuator including a drive pulley 11 in engagement with the line 9' can exert traction thereon in order to shift the turbine 2 over at least a fraction of the circular path C. Alternatively or in addition to the drive pulley 11, the actuator may comprise or include a linear actuator, e.g. a chain actuator, engaging the anchor line 9' directly or via an intermediate device, such as, for example a winch-and-pulley assembly. Although, in the embodiment shown, the actuator is on board the floating platform, in another embodiment, the traction on the line 9' could be exerted by an external actuator, e.g. by an actuator on board a maintenance ship that docks with the floating platform 1 with means making it possible to connect to the line 9' and to exert traction thereon in order to shift the turbine 2. This alternative is particularly useful for seasonally shifting the turbine 2.

Figure 4A:
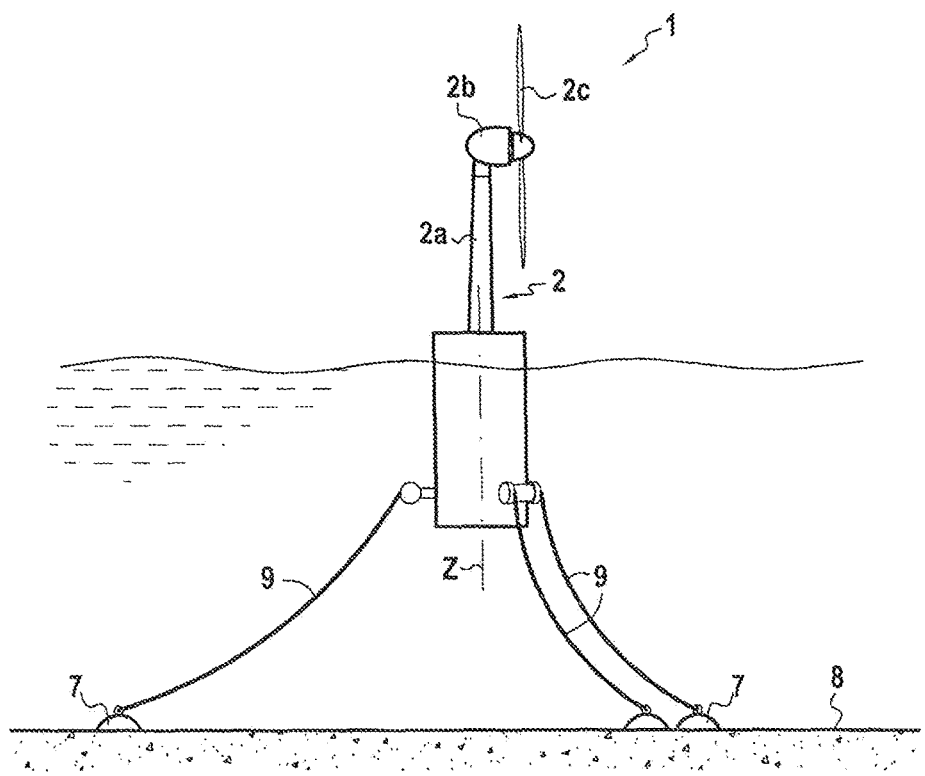
FIG. 4A is a side view of a fourth embodiment, of a floating platform of the present invention.
Figure 4B:
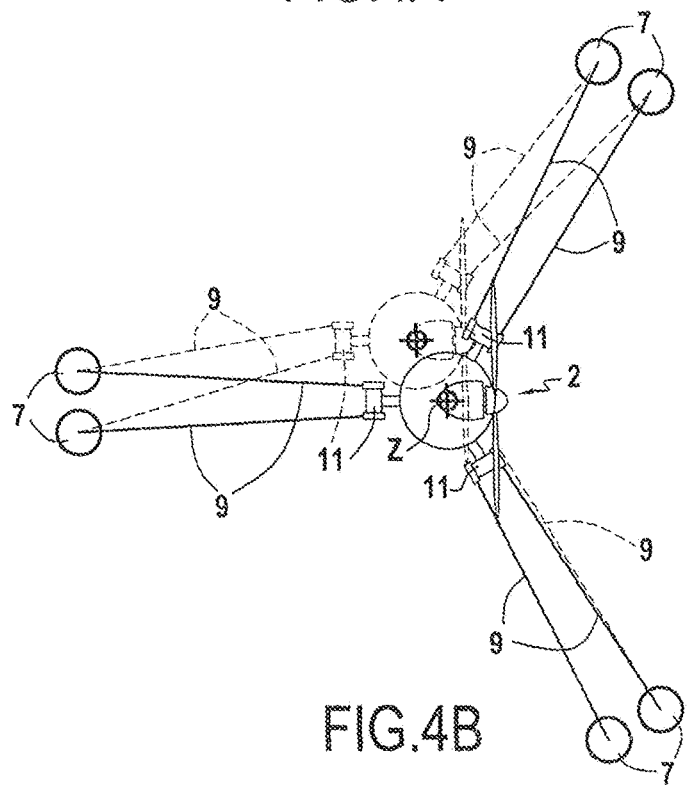
FIG. 4B is a view from above of the installation of FIG. 4A.

In a fourth embodiment, shown in FIGS. 4A and 4B, the floating platform 1 supports the wind turbine 2 and is anchored to a plurality of anchor points 7 on the sea floor 8 via anchor lines 9. On the floating platform 1, actuators including drive pulleys 11 in engagement with the lines 9 can exert traction thereon in order to shift, the turbine 2 at least in a horizontal plane.

Figure 5A:
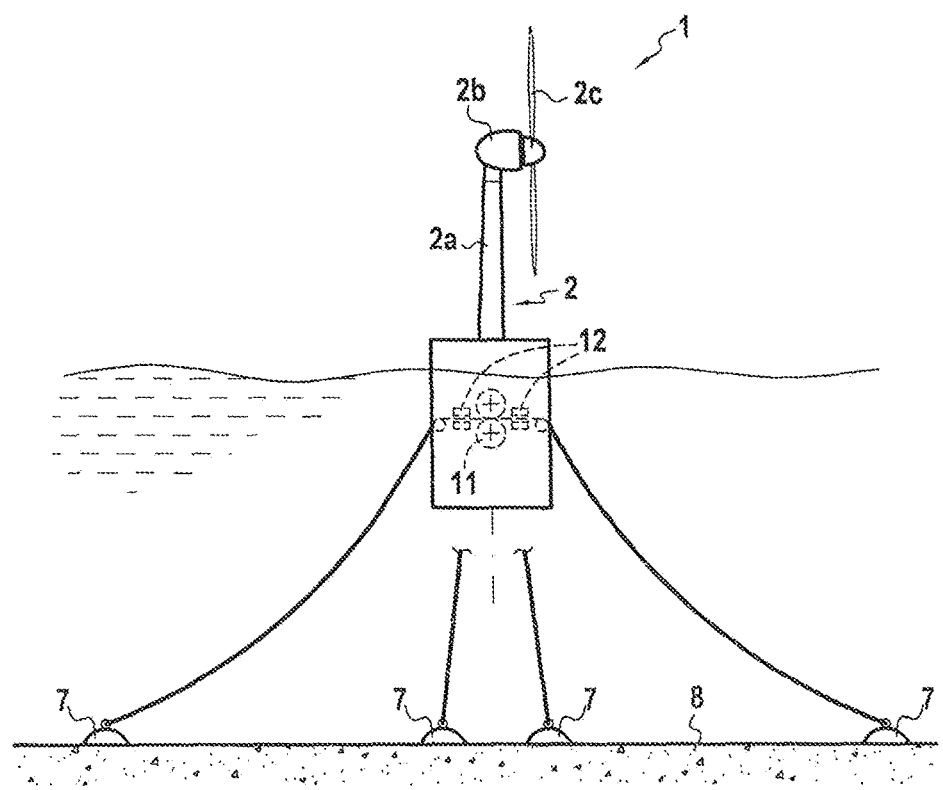
FIG. 5A is a side view of a fifth embodiment of a floating platform of the present, invention.
Figure 5B:
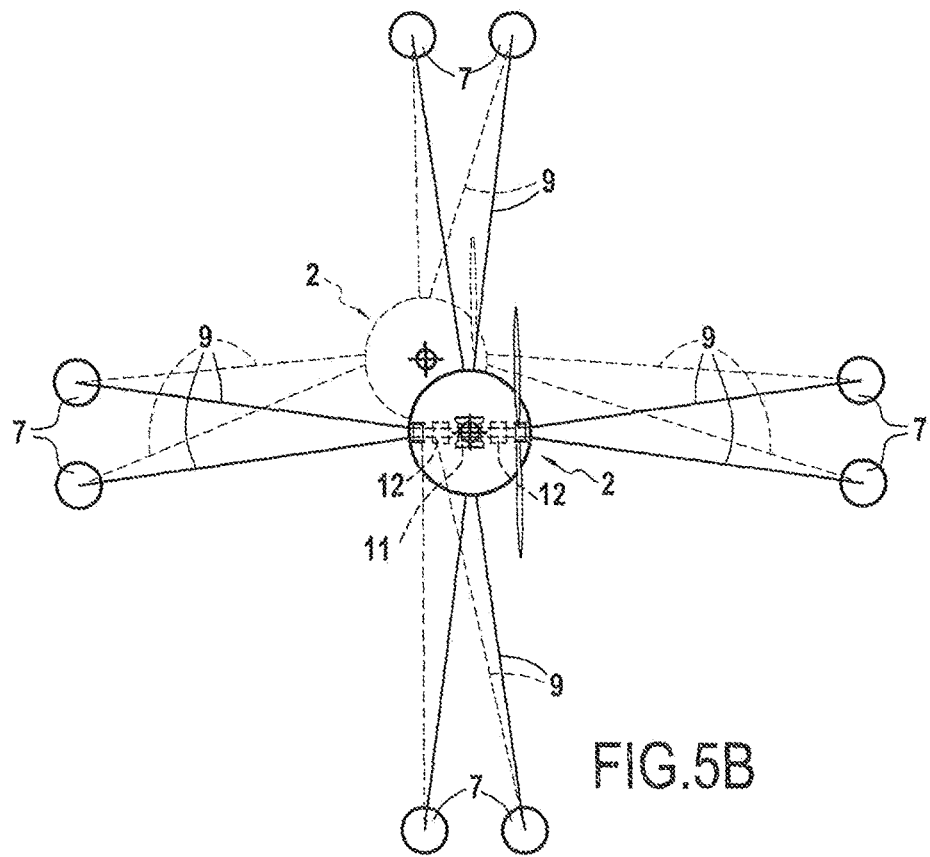
FIG. 5B is a view from above of the floating platform of FIG. 5A.
Figure 6:
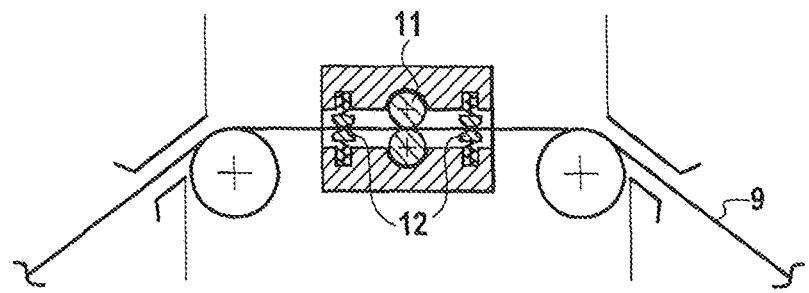
FIG. 6 is a detail view from above of the device for shifting the floating platform of FIGS. 5A and 5B.

In a fifth embodiment, shown in FIGS. 5A and 5B, the floating platform 1 supports the wind turbine 2 and is anchored to a plurality of anchor points 7 on the sea floor 8 via anchor lines 9. However, in this embodiment, each of the lines 9 is attached via respective ones of its two ends to different anchor points 7. On the floating platform 3, actuators include drive pulleys 11 in engagement the lines 9 so as to exert traction thereon in order to shift the turbine 2 at least in a horizontal plane. Brakes 12 are also present on the floating platform 3 so as to stop the lines 9 and so as to set the position of the platform once the controlled shift has finished. This device is shown more clearly in FIG. 6.

In these two examples too, alternatively or in addition to the drive pulley 11, the actuator could comprise or include a linear actuator, e.g. a chain actuator, engaging the anchor line 9 directly or via an intermediate device, such as, for example a winch-and-pulley assembly. The actuator could also be on board a maintenance ship for seasonal visits, rather than on board the floating platform itself.

Figure 7:
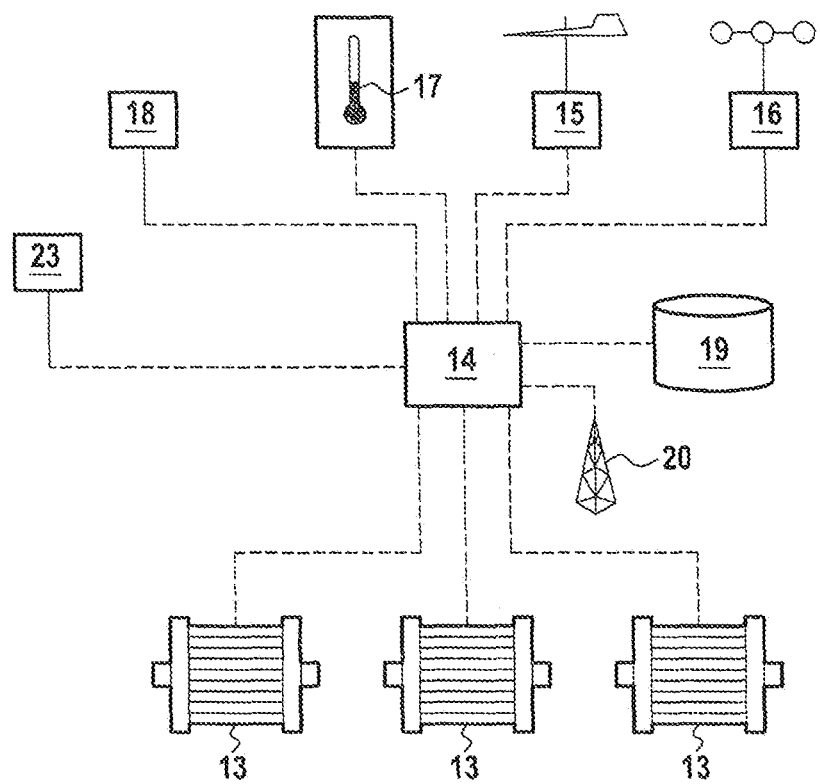
FIG. 7 is a diagram of a control system of any of the platforms from the second embodiment to the fifth embodiment.

Apart from the first embodiment, with its passive shift device actuated directly by the wind, each embodiment shown includes an active shift device that can be controlled as a function of a set of parameters, including wind direction. For this purpose, as shown in FIG. 7, it is possible to connect the actuators 13 of the marine thrusters or drive pulleys to a control unit 14, which is in turn connected to a wind direction sensor 15, to a wind speed sensor 16, to a temperature sensor 17, to a swell sensor 18, and to a water current sensor 23. The control unit 14 may also be connected to a data storage device 19 containing a table of optimum or sub-optimum positions for predefined weather conditions, in particular as a function of wind direction, and to a device 20 for receiving external data, e.g. weather conditions over a zone that is larger than the zone covered by the sensors 15 to 18.

In order to minimize the wake effects, it would also be possible to cause the wind turbines 2 to shift, in a vertical direction. For this purpose, the floating platforms 1 could include a device for varying the ballasting, or telescopic towers for supporting the wind turbines 2.

Figure 8A:
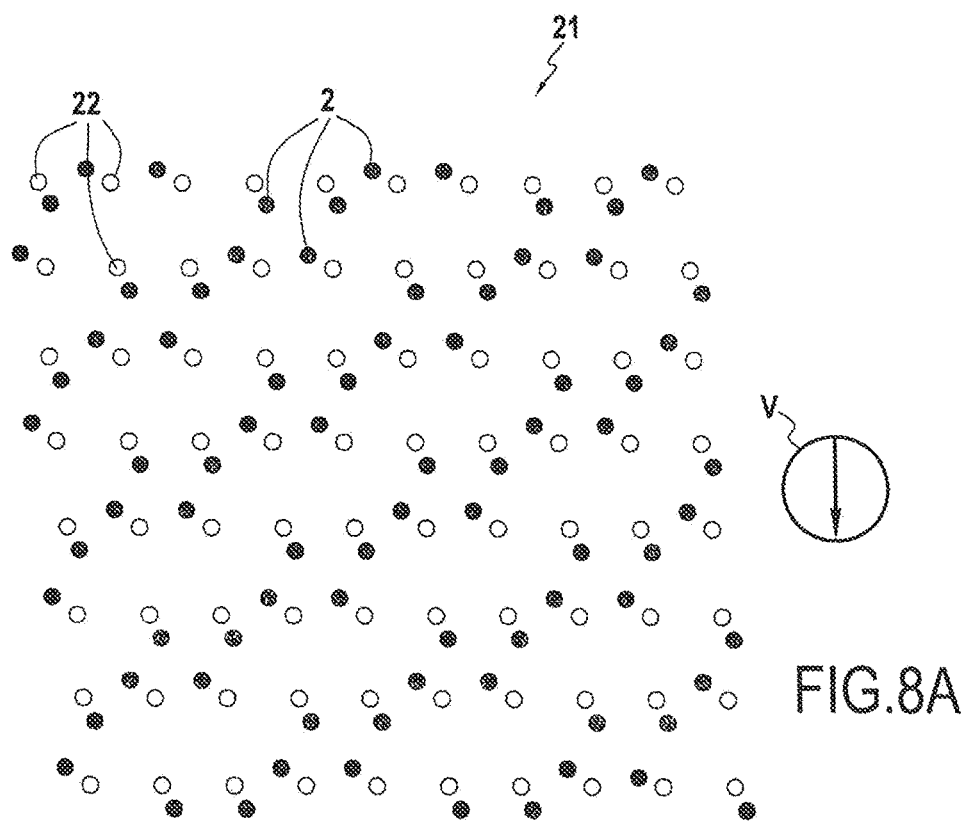
FIGS. 8A, 8B, and 8C diagrammatically show configurations of an embodiment of a wind farm of the invention, with various different wind directions.
Figure 8B:
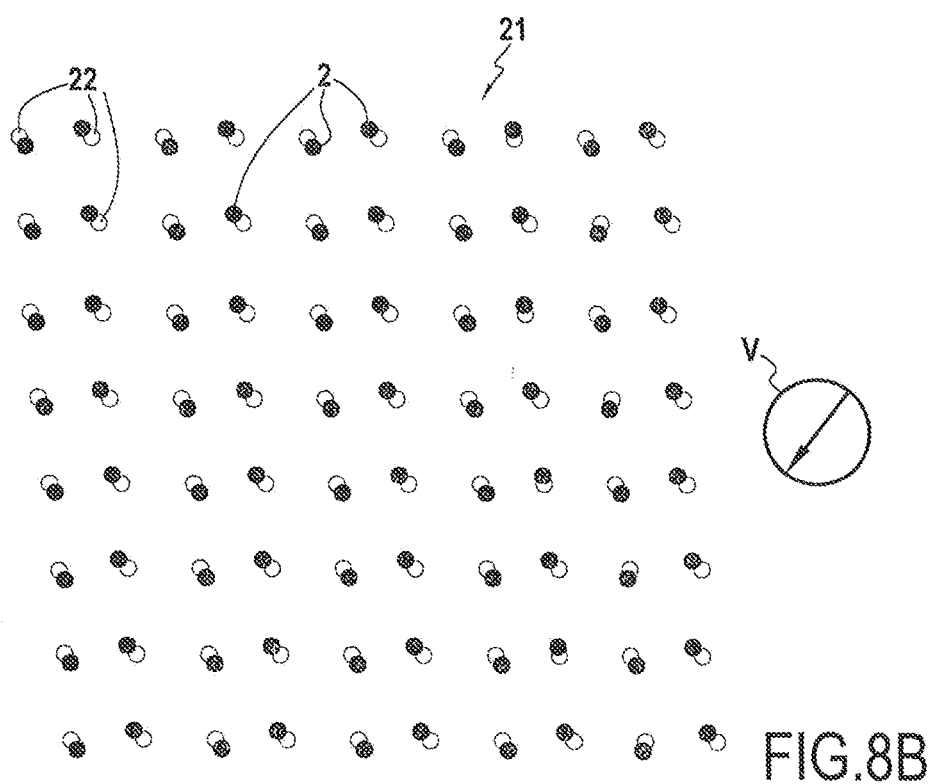
Figure 8C:
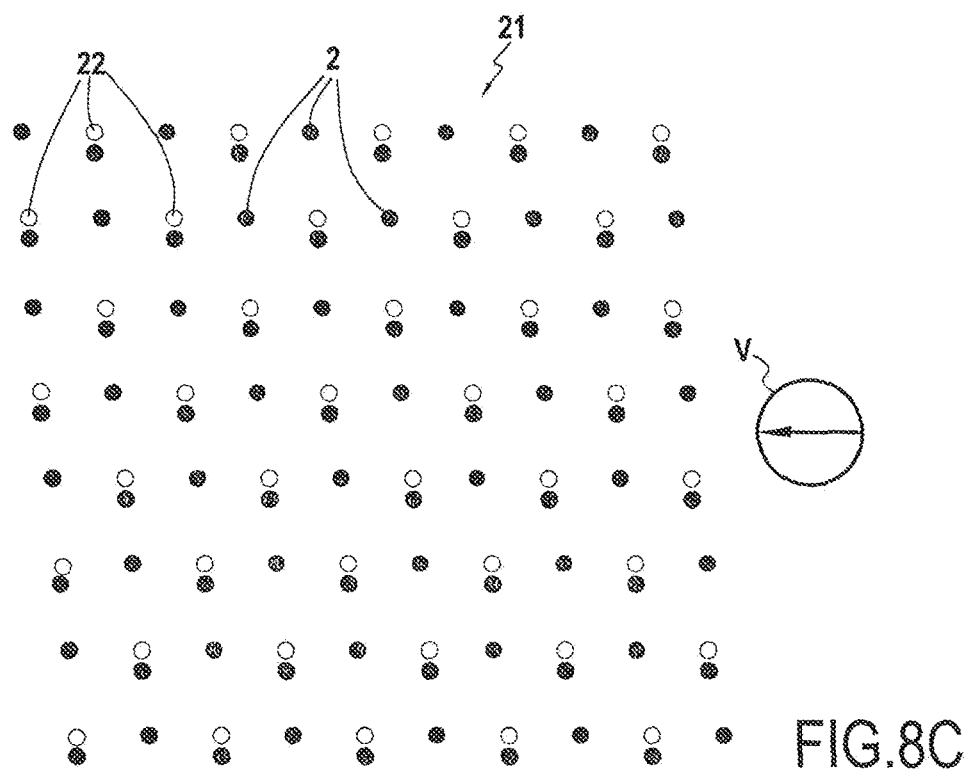

The main purpose of shifting the turbines 2, in particular in a horizontal plane, is to avoid wake effects in wind farms including a plurality of such turbines. FIGS. 8A to 8C show the positioning of the wind, turbines 2 in such a wind farm 21 for various different wind directions V. Starting from a base position 22, each wind turbine 2 can be caused to shift as a function of factors such as wind direction and wind speed, temperature, swell, other local or global weather parameters, the characteristics and. depth of the sea floor, etc. in such a manner as to minimize the wake effects, thereby maximizing the power generation of the set of turbines 2.

Figure 9:
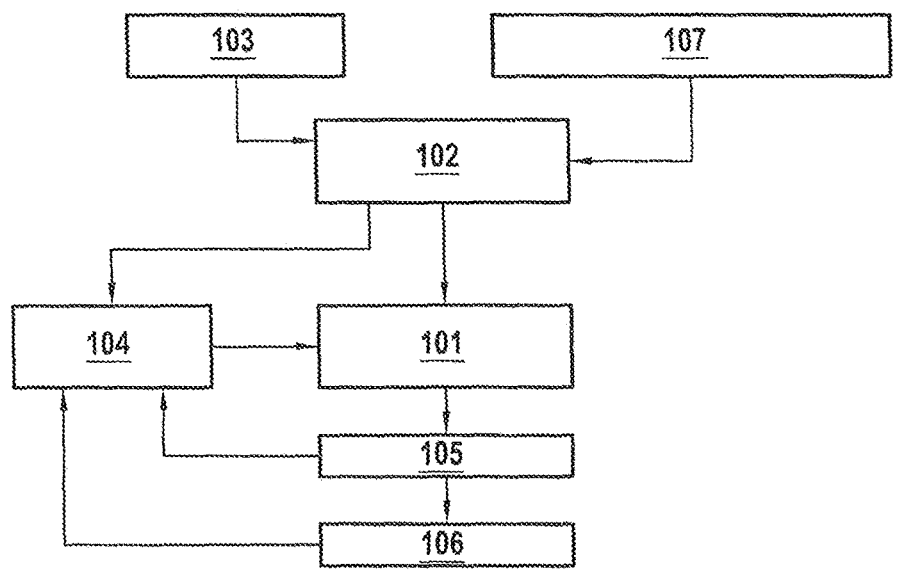
FIG. 9 diagrammatically shows a method of designing a wind farm.

In a first step of designing such a wind farm 21, shown in FIG. 9, an optimization algorithm 101 can be applied to a model 102 for simulating the wake losses of the wind farm, while taking account of the constraints 103 for shifting the turbines 2 so as to seek solutions 105 for positioning each movable turbine 2 with a variety of different weather parameters 107, in particular wind direction, which solutions are optimum or sub-optimum relative to the optimum power generation of the wind farm 106. Said solutions can then be recorded in the table 104 of optimum or sub-optimum positions for said weather conditions. The optimization algorithm 101 may, for example, be a combinatorial algorithm, a heuristic algorithm such as the "simulated annealing" algorithm, a genetic algorithm, etc. The wake model 102 may, for example be an N. O. Jensen wake model, an Ainslie model, or a viscosity-turbulence model.

Figure 10:
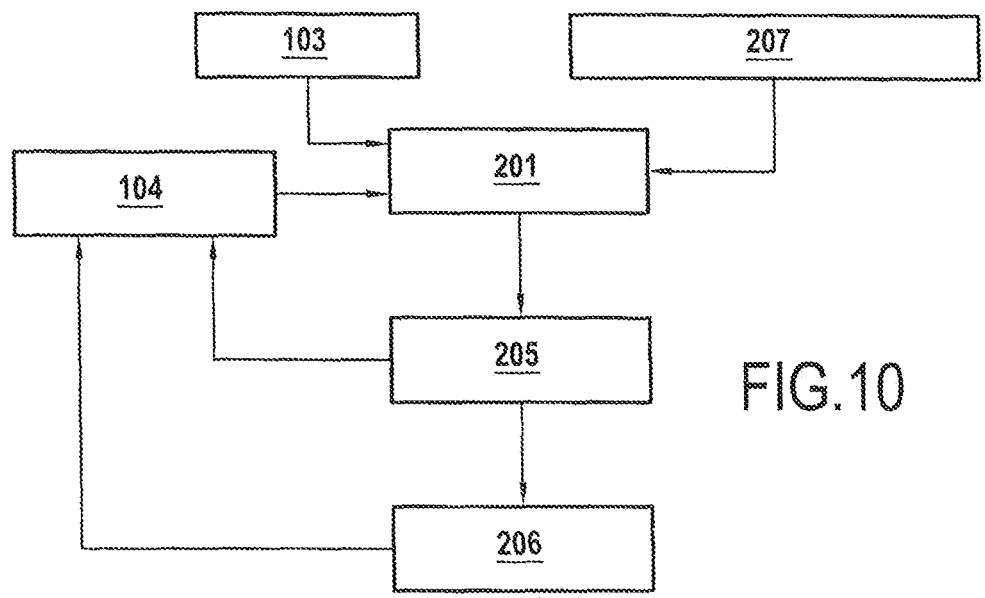
FIG. 10 diagrammatically shows a first method of controlling the positioning of the turbines in a wind farm designed using the method of FIG. 9.

During operation of this wind farm 21, an algorithm 201 of the "nearest neighbor" type can be used, on the basis of the table 104 of optimum or sub-optimum positions, on the basis of the constraints 103 for shifting the turbines, and on the basis of the real weather conditions 207, in order to generate setpoints 205 for positioning the turbines 2, and an estimate of the power generation of the wind farm 206, as shown in FIG. 10.

Figure 11:
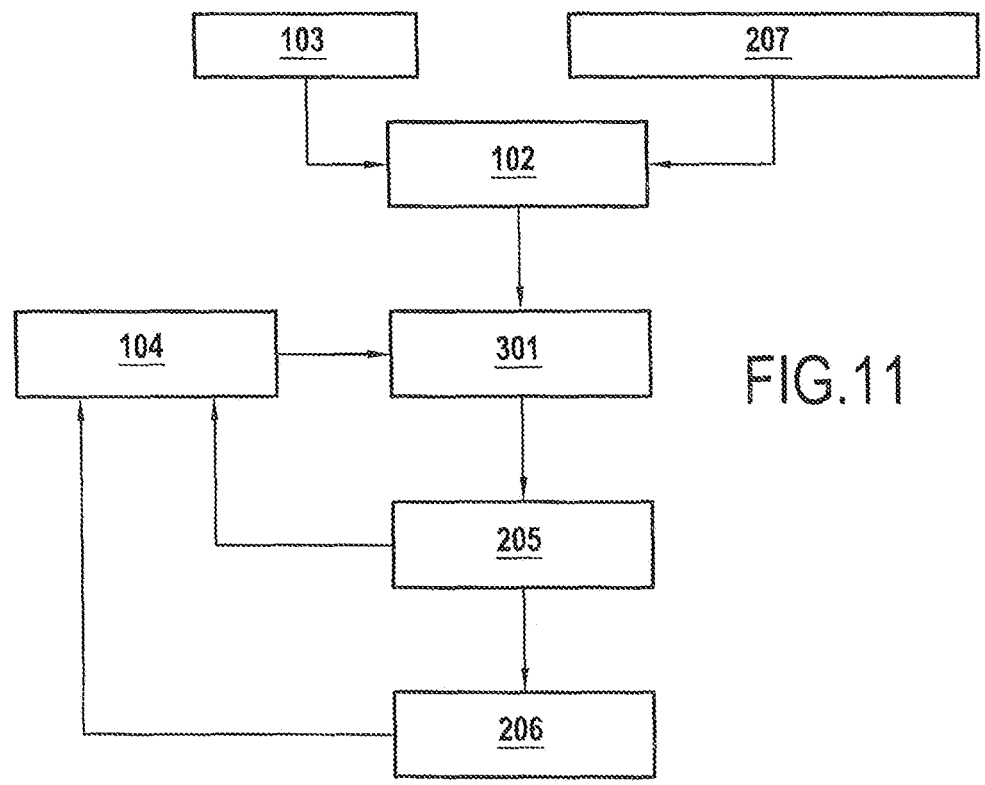
FIG. 11 diagrammatically shows a second method of controlling the positioning of the turbines in a wind farm designed using the method of FIG. 9.

Alternatively, if sufficient data-processing capacities are available, the setpoints 205 for positioning the turbines 2 can be generated in real time by another optimization algorithm 301, on the basis of the model 102, of the shift constraints 103, of the real weather conditions 207, and of the table 104, as shown in FIG. 11.

In both situations, the new positioning setpoints 205 may be presented to a human operator for confirmation before being transmitted to the actuators 13. If the human operator modifies the setpoints 205, a test for testing the validity of the modified setpoints relative to the movability constraints of the turbines 2 may be run before transmitting the new setpoints to the actuators 13.

If the wind farm 2.1 is situated in a place with seasonal prevailing winds that are strongly predominant, it is possible, rather than shifting the turbines under real-time control, to shift them collectively or one-by-one periodically at quite long intervals. In such a situation, rather than connecting each floating platform 1 of the wind farm 21 to a control center, teams of operators can go to the installations to shift the wind turbines 2, with actuators on board the floating platforms 1 or on board maintenance ships.

Although the present invention is described with reference to specific embodiments, it is clear that various modifications and changes may be made to these examples without going beyond the general scope of the invention as defined by the claims. For example, although the wind turbines shown are turbines having rotors with horizontal axes, the invention is also applicable to turbines having rotors with vertical axes. In the same way, the actuators proposed for the shifting could be not only motor-driven pulleys or hydrodynamic thrusters, but also chain actuators, racks, undersea hydrodynamic foils, or a combination of such elements. Although, in all of the embodiments shown, the floating platform is anchored to a plurality of anchor points via anchor lines, which offers the advantage of procuring good, stability with comparatively simple means, alternative means for anchoring to the sea floor or to pre-existing fixed, structures may also be imagined. In addition, although the wind turbines described are particularly well suited to generating electricity, the invention is also applicable to exploiting wind energy for other purposes, such as, for example, pumping, or desalinating seawater. Finally, although the invention has been described as applied to offshore sea use, it is naturally equally applicable to any stretch of water, such as, for example, natural or artificial lakes, lagoons, rivers, or estuaries. Therefore, the description and the drawings should be considered as being given illustratively rather than restrictively.

I claim:

1. A wind farm including a control unit and a plurality of floating platforms, each of which is anchored to at least one anchor point and includes:
   at least one wind turbine; and
   a shift device for shifting the wind turbine as a function of a set of parameters, including wind direction, in order to minimize aerodynamic wake effects;
   wherein each shift device is connected to the control unit, which is connected to a data storage device containing a table of predefined positions for maximizing power generation, which positions are computed using a model for simulating the aerodynamic wakes of the floating platforms for said set of parameters.

2. The wind farm according to claim 1, wherein said shift device is an active shift device.

3. The wind farm according to claim 2, wherein said active shift device is connected to the control unit, wherein the control unit is configured to be connected to a set of sensors, including at least one wind direction sensor, for causing the wind turbine to shift as a function of signals transmitted by said set of sensors.

4. The wind farm according to claim 2, wherein said active shift device includes at least one actuator suitable for pulling on an anchor line in order to shift the wind turbine.

5. The wind farm according to claim 4, wherein the anchor line coupled to said at least one actuator has two ends, each of which is connected to a different anchor point.

6. The wind farm according to claim 2, wherein said active shift device includes at least one hydrodynamic thruster suitable for exerting thrust to shift the wind turbine.

7. The wind farm according to claim 1, wherein at least one floating platform of said plurality of floating platforms includes a mooring buoy and a floating arm that supports said wind turbine and that is connected to said mooring buoy via a hinge having at least a vertical axis of rotation.

8. The wind farm according to claim 1, wherein said shift device is suitable for shifting the wind turbine in a horizontal plane.

9. The wind farm according to claim 1, wherein said shift device is suitable for shifting the wind turbine vertically.

10. A method of exploiting wind energy, the method comprising:
    anchoring at least one floating platform of a set of floating platforms to one or more anchoring points, wherein the at least one floating platform comprises at least one wind turbine; and
    shifting the at least one wind turbine into a predefined position for maximizing power generation, which position is computed using a model for simulating the aerodynamic wakes of the set of floating platforms for a set of parameters including wind direction, as a function of said set of parameters, in order to minimize aerodynamic wake effects and in order to maximize the power generation of the at least one floating platform.

11. The method of exploiting wind energy according to claim 10, wherein the at least one wind turbine is shifted by traction exerted by an actuator on at least one anchor line.

12. The method of exploiting wind energy according to claim 10, wherein the at least one wind turbine is shifted by an immersed thruster.

13. The method of exploiting wind energy according to claim 10, wherein the at least one wind turbine is shifted on a floating arm that is mounted to turn about a mooring buoy to which it is connected via a hinge having at least a vertical axis of rotation.

14. The method of exploiting wind energy according to claim 13, wherein the floating arm is mounted to turn about the mooring buoy.

15. The method of exploiting wind energy of claim 10, wherein the at least one floating platform includes a plurality of floating platforms.

16. The method of exploiting wind energy of claim 10, wherein the one or more anchoring points are on a sea floor.

* * * * *